Jan. 9, 1934.  A. M. R. KARLSTRÖM  1,943,180
APPARATUS FOR THE SEPARATION OF PARTICLES FROM LIQUIDS
Filed Oct. 2, 1929
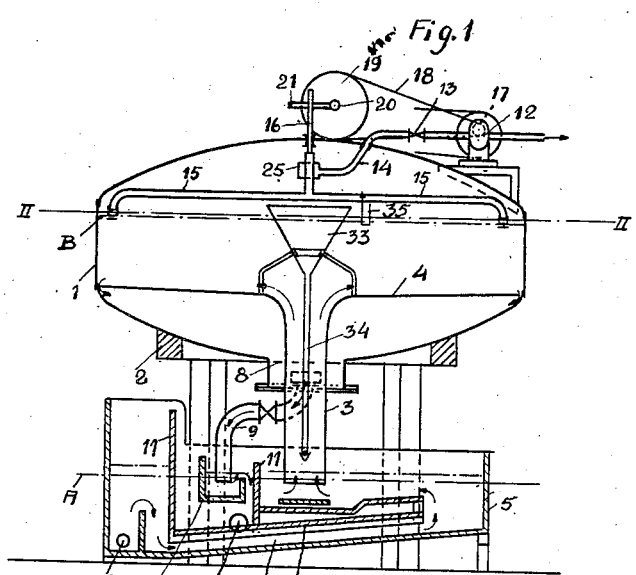
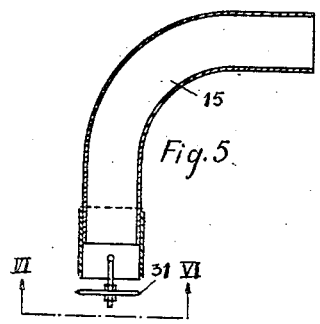
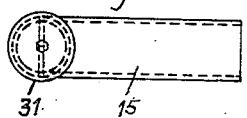
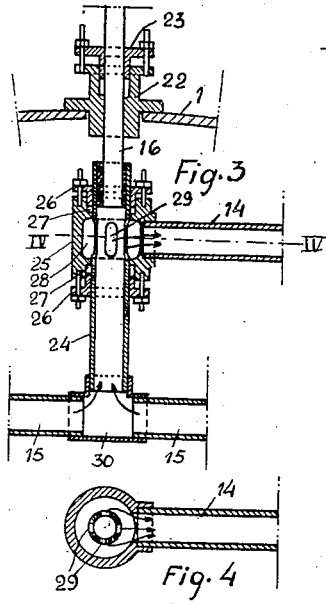
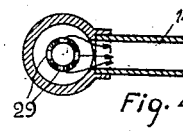
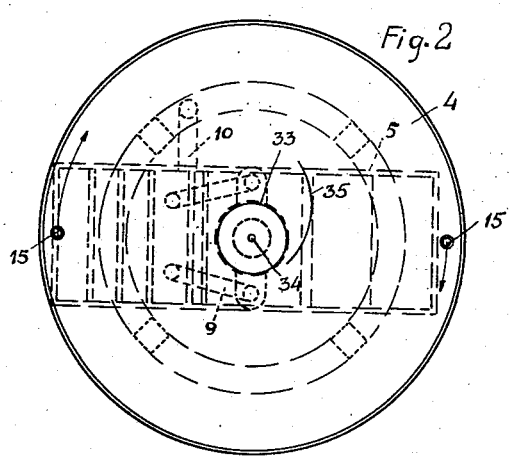
INVENTOR
Adolf M. R. Karlstrom
By William C. Linton
Attorney.

Patented Jan. 9, 1934

1,943,180

UNITED STATES PATENT OFFICE 1,943,180

APPARATUS FOR THE SEPARATION OF PARTICLES FROM LIQUIDS

Adolf Magnus Rupert Karlström, Hyltebruk, Sweden

Application October 2, 1929, Serial No. 396,745, and in Sweden October 3, 1928

2 Claims. (Cl. 210—53)

The present invention relates to apparatus for the separation of particles from liquids and particularly to such apparatus as comprises a tank into which the liquid intermingled with air or gas and fibres or other particles is introduced and in which a reduced pressure is maintained so that the air or gas bubbles, which adhere to the particles, obtain an increased lifting capacity and lift the particles to the surface of the liquid within the tank from which they are removed through a conduit by the suction of a pump.

The invention has for its object to remove the deficiencies of prior apparatus of the type referred to so that the particles will be separated in the highest possible degree.

An embodiment of the invention is illustrated in the accompanying drawing in which Fig. 1 shows a vertical section of the apparatus; Fig. 2 is a horizontal section of the same on the line II—II of Fig. 1; Fig. 3 is a vertical section in a larger scale showing the connection between the fix suction conduit and the movable suction nozzles; Fig. 4 is a horizontal section on the line IV—IV of Fig. 3; Fig. 5 is a vertical section of the outer end of the suction nozzle; Fig. 6 is a view of the device according to Fig. 5 shown from below as indicated by the line VI—VI of Fig. 5.

In the drawing, 2 denotes a frame carrying a tank 1 which has a cylindrical circumference with vertical axis. The top and the bottom of the tank are preferably bent outwards as shown. Through the bottom of the tank there extends a vertical tube 3 which widens within the tank in the shape of a retardation nozzle 4. The lower end of the tube is located within a vat 5 receiving the liquid to be treated through a conduit as indicated at 6. This liquid contains air or gas and the fibres or particles to be recovered or separated from the liquid. Before entering into the tube 3 the liquid passes through an inclining channel 61 with an angular top 62 and during the passage through this channel superfluous air or gas bubbles will be separated from the liquid. At the bottom of the tank an opening 8 is provided round the tube 3. Through this opening the purified liquid flows through a conduit 9 into a compartment 7 within the vat 5 and escapes through a conduit as indicated at 10. Within the vat 5 there are arranged partitioning walls 11 separating the entering liquid to be purified from the escaping, purified liquid.

A reduced pressure within the tank 1 is maintained and the mass of particles ascended to the surface of the liquid within the tank is removed by means of a pump 12 which by a conduit 14 having a regulating valve 13 is connected with the tank. The conduit 14 extends to the centre of the upper portion of the tank and is connected with one or more movable suction nozzles 15 (two in the drawing) which have the shape of substantially horizontal tubes with the outer ends bent down. These ends extend near to the cylindrical wall of the tank. The tubes or nozzles 15 are designed to be rotated with the axis of the tank as a centre by means of a vertical shaft 16 extending down into the tank and driven by the same motor as the pump 12 by means of a belt gearing 17, 18, 19. A worm 20 upon the shaft of the pulley 19 engages with a worm-wheel 21 upon the shaft 16 which by these means is rotated by the belt gearing. The passage of the shaft through the top of the tank is stopped up by a stuffing box 22 with gland 23 or by a mercury trap. The lower end of this shaft carries a tube 24 passing through a stuffing box 25 fixedly connected to the suction conduit 14 which tube 24 is rotatable within the stuffing box 25. The upper and lower ends of the stuffing box 25 fit tightly to the tube 24 by means of glands 26. Between the seats for its packing rings 27 the stuffing box 25 is widened round the tube 24 so that a space 28 is provided between the tube and the inner side of the box. The tube or conduit 14 extends to said space which communicates with the tube 24 by a suitable number of openings 29 in the wall of the tube 24. The lower end of this tube is connected with the tubes or nozzles 15 by a coupling-box 30. Each of the bent outer ends of the tubes or nozzles 15 carries a horizontal plate or screen 31 positioned slightly below the opening of the tube or nozzle.

Within the tank between the nozzles 15 and the retardation nozzle 4 in the centre of the tank a funnel-shaped body 33, having the point or narrower end directed downwards, is provided. To the lower end of the funnel a narrow tube 34 is connected so that the interior of the funnel communicates with the interior of the tube 3 and is filled with liquid at the same time as the tank. This funnel may be provided with longitudinal ribs on its outer side. The object of the funnel is to direct the current of the ascending liquid towards the periphery of the tank.

The mode of operation of the apparatus is as follows:—

Before the apparatus is started, the liquid stands about the level indicated by the line A of Fig. 1, and in order to start the apparatus it is filled for instance by a pressure water conduit while the conduits 3 and 9 are closed by suitable means. When the liquid has reached the level B in the tank 1 the pump is caused to operate in order to maintain the vacuum and the position of the level at B. When the conduits 3 and 9 have been opened, the liquid to be treated (for instance back-water from paper mills &c.) can flow up through the tube 3 and the air or gas bubbles adhering to the particles will lift the particles to the surface of the liquid in paths which are more or less diverted from the vertical direction according to the intensity of the air or gas charges of the different particles. In the same degree as the particles flow out to the periphery they are continuously sucked up all round the surface of the liquid by means of the nozzles 15 rotating with the shaft 16. On account of the cylindrical shape of the tank 1 the particles will be spread out on a relatively large area and the purified liquid will descend along the wall of the tank in such a direction that it will not interfere with the ascending non-purified liquid. From the nozzles 15 the mixture of particles and liquid through the tube 24 enters into the space 28 of the stuffing box 25 and from this space it will be forwarded through the suction conduit 14 to the pump 12 and from the latter to the place where the mass is to be utilized or removed from the system. At the same time as the mass is sucked out from the tank also air or gas delivered to the space above the liquid in the tank will be sucked out through the nozzles 15 so that the required vacuum is maintained within the tank. The plate or screen 31 beneath each of the ends of the suction tubes or nozzles has the function to conduct the current of particles in a substantial horizontal, lateral direction towards the opening of the tube or nozzle and prevent entering of liquid right from below.

Naturally many modifications of the apparatus may be made without interfering with the scope of the invention. For instance, only one suction nozzle may be arranged and this may be sufficient in certain cases. The suction nozzles also may be more than two and extend radially to different lengths. It is also possible to substitute a rotatable scraping device for the suction nozzles which scraping device forwards the ascended particles towards one or more suction conduits connected to the cylindrical wall of the tank. In the drawing, a scraping plate 35 is fixed to the tube 15 and has such a shape that it will push the upper layer of the liquid towards the periphery of the tank in the rotation of the nozzles.

It is also possible to arrange one pump for the maintenance of the vacuum within the tank and a second pump for the removal of the mass.

What I claim is:—

1. An apparatus for the separation of particles such as fibres from liquids comprising in combination a closed tank, an upwardly directed inlet for the introduction of liquid intermingled with particles and gas into the tank, said inlet extending substantially centrally into the tank, a stationary suction conduit connected to the tank, a rotatable suction nozzle movable substantially horizontally within the tank and adapted to maintain a reduced pressure within the tank whereby the particles by adhering gas bubbles are lifted to the surface of the liquid and to suck up the ascended particles and forward the same to the stationary suction conduit, the vertical distance between the mouth of the central inlet within the tank and the horizontal plane in which the suction nozzle operates being much smaller than the lateral extension of the tank in said plane, an outlet for the purified liquid at the lower part of the tank, and means whereby the purified liquid is supplied to the outlet in a substantially evenly distributed flow all round the tank.

2. An apparatus for the separation of particles such as fibres from liquids, comprising a tank, an inlet for the introduction of liquid to be treated into said tank, a movable suction nozzle adapted to suck off the particles ascended to the surface of the liquid, and a substantially horizontal screen attached to said nozzle beneath the entrance opening thereof, said screen spaced from the end of the suction nozzle so as to create a horizontal movement of the liquid toward the nozzle.

ADOLF MAGNUS RUPERT KARLSTRÖM.